Jan. 23, 1962    J. H. MULLEN ETAL    3,018,338
CONTROL SWITCHES

Filed Dec. 18, 1958    5 Sheets-Sheet 1

WITNESSES

INVENTORS
John H. Mullen &
William F. Born
BY
ATTORNEY

Jan. 23, 1962   J. H. MULLEN ETAL   3,018,338
CONTROL SWITCHES
Filed Dec. 18, 1958   5 Sheets-Sheet 2

Jan. 23, 1962   J. H. MULLEN ETAL   3,018,338
CONTROL SWITCHES
Filed Dec. 18, 1958   5 Sheets-Sheet 3

Jan. 23, 1962 J. H. MULLEN ETAL 3,018,338
CONTROL SWITCHES
Filed Dec. 18, 1958 5 Sheets-Sheet 4

Jan. 23, 1962         J. H. MULLEN ETAL         3,018,338
                         CONTROL SWITCHES
Filed Dec. 18, 1958                          5 Sheets-Sheet 5

United States Patent Office 3,018,338
Patented Jan. 23, 1962

3,018,338
CONTROL SWITCHES
John H. Mullen, Brighton Township, Beaver County, and William F. Born, Beaver, Pa., assignors to Westinghouse Electric Corporation, East Pittsburgh, Pa., a corporation of Pennsylvania
Filed Dec. 18, 1958, Ser. No. 781,377
8 Claims. (Cl. 200—16)

This invention relates, generally, to control switches and, more particularly, to switches of the push-button type.

An object of the invention is to provide a switch operating unit which may be utilized with contact units of different types.

Another object of the invention is to provide a switch having a non-rotatable operating button which may be utilized to contain switch nomenclature.

A further object of the invention is to provide for actuating a plurality of switch contact units by means of a single operating unit.

Still another object of the invention is to provide separately enclosed contact units which may be mounted on an operating unit in either side-by-side relation or in tandem relation or in both side-by-side and tandem relation.

A still further object of the invention is to provide an enclosed contact unit in which either normally open contact members or normally closed contact members may be mounted.

Other objects of the invention will be explained fully hereinafter or will be apparent to those skilled in the art.

In accordance with one embodiment of the invention, a set of normally closed contact members is mounted in an enclosed contact unit and a set of normally open contact members is mounted in a similar enclosed contact unit. A plurality of the contact units may be mounted on an operating unit in either side-by-side relation or in tandem relation or in both side-by-side and tandem relation and actuated by a single operating member. Thus, various combinations of contact members may be provided as required. The head of the operating member may be covered with a clear plastic snap disc under which nomenclature may be provided or the discs may be of different colors indicating the function of each switch.

For a better understanding of the nature and objects of the invention, reference may be had to the following detailed description taken in conjunction with the accompanying drawings in which.

Figure 1:
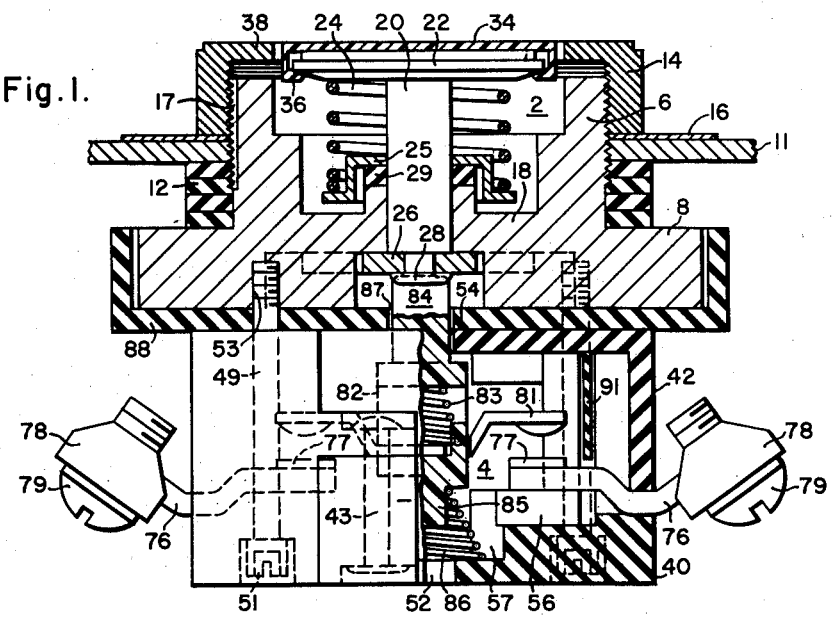
FIGURE 1 is a view, partly in section and partly in elevation, of a control switch assembly embodying features of the invention and showing an operating unit and a contact unit having normally open contact members.
Figure 2:
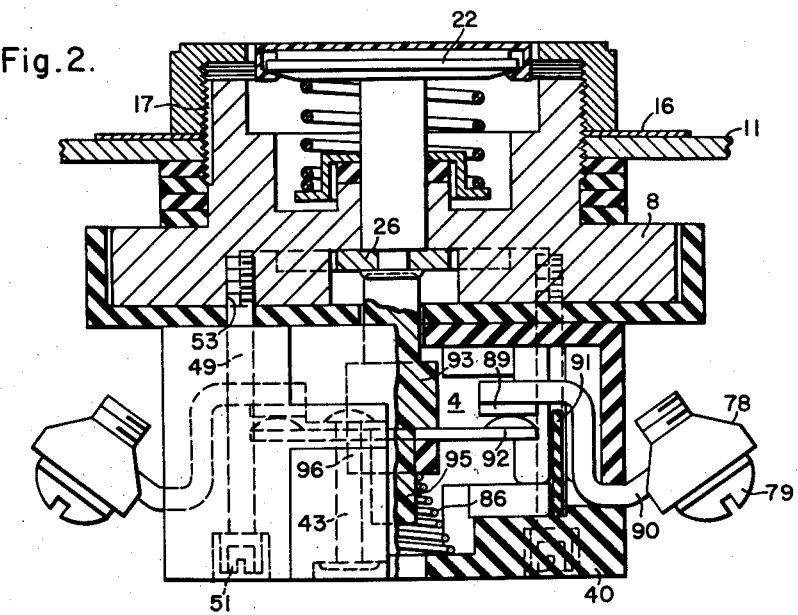
FIG. 2 is a view, similar to FIG. 1, of the operating unit and a contact unit having normally closed contact members.

Referring to the drawings, and particularly to FIGS. 1 and 2, the switch structure shown therein comprises an operating unit 2 and a contact unit 4. The operating unit 2 includes a supporting sleeve 6, preferably of a cast metal, and having a flange 8 on the inner end thereof adapted to engage the inner side of a supporting panel 11. A plurality of sealing discs 12, composed of any desirable sealing material, such as rubber, may be interposed between the flange 8 and the inner surface of the panel 11. It will be understood, that the number of discs 12 utilized depends upon the thickness of the panel 11.

Figure 15:
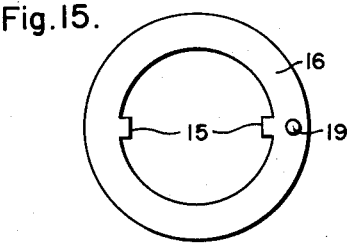

A portion of the sleeve 6 is exteriorly threaded for receiving an internally threaded clamping ring 14 which is adapted to secure the sleeve 6 to the panel 11 when the clamping ring is drawn up tightly. A washer or adapter 16 may be provided between the clamping ring 14 and the panel 11. The washer has projectins 15 (see FIG. 15) thereon which are disposed in slots 17 in the sleeve 6. The washer 16 may carry suitable indicia for proper identification of the switch and for indicating operative positions of the switch. A pin or projection 19 may be provided on the washer 16 to fit into a hole 21 in the panel 11 thereby preventing the switch from turning in the panel 11. Thus, the washer may be utilized as an adapter for mounting the present switch on a panel drilled for a switch of a prior type.

The supporting sleeve 6 of the switch operating unit has a transversely extending web 18 having a central opening therein for slidably receiving an operating shaft 20. An operating head 22 may be formed integrally with the shaft 20 or secured thereto in any suitable manner. A compression spring 24 is disposed between the operating head 22 and a retainer disc 25 seated on the web 18 to normally bias the operating head 22 to the outer limit of its movement.

The outer movement of the operating head 22 is limited by an actuating member or disc 26 which is secured to the lower end of the shaft 20 by riveting a reduced portion of the shaft 20 over the lower surface of the disc as shown at 28. A sealing washer 29 is disposed around the shaft 20 between the retainer disc 25 and the web 18 of the supporting sleeve 6. The washer 29 is compressed by the spring 24 acting upon the retainer disc 25, thereby preventing any liquid or other matter from passing through the opening in which the shaft 20 is mounted.

Figure 7:
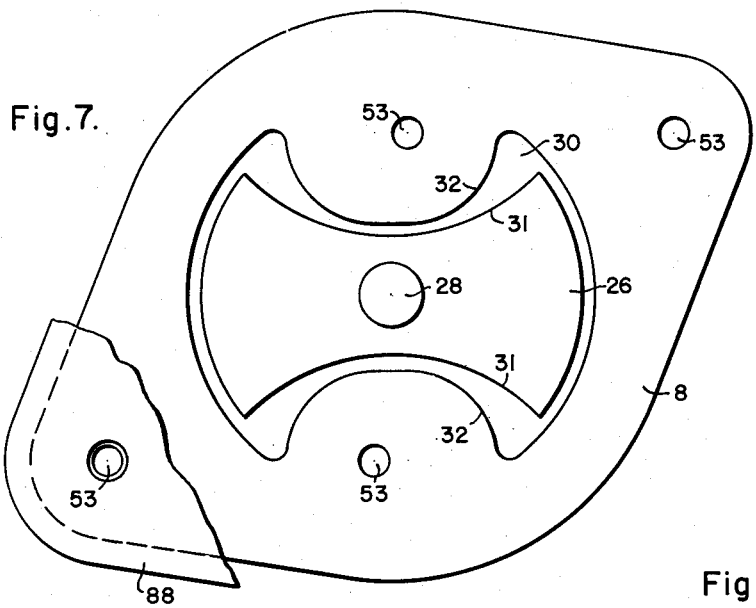
FIG. 7 is a view, in bottom plan, of the operating unit.
Figure 14:
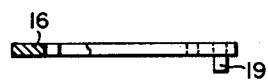
FIGS. 14 and 15 are reduced views, in elevation and plan, of an adapter which may be utilized with the control switch.

As shown most clearly in FIG. 7 the actuating member or disc 26 is disposed in a recess 30 in the bottom side of the flange 8 on the sleeve 6. The disc 26 has concave edges 31 which engage with convex walls 32 of the recess 30 to prevent rotation of the disc 26 beyond a predetermined amount. Thus, rotation of the operating head 22 beyond a predetermined amount is prevented.

As shown in FIG. 1, a generally cup-shaped disc 34 is attached to the operating head 22. The rim of the disc 34 has an inwardly extending portion 36 thereon which engages the under surface of the operating head 22 to retain the disc 34 on the operating head. The clamping ring 14 has an inwardly extending flange 38 thereon which is above the inturned portion 36 of the disc 34 when the clamping ring is in position on the sleeve 6 to retain the operating unit on the panel 11. Thus, the disc 34 cannot be removed from the operating head without first removing the clamping ring 14.

The disc 34 may be composed of a clear or transparent plastic material, thereby enabling suitable nomenclature to be provided on the top of the operating head underneath the disc 34. If desired, the disc 34 may be composed of a colored plastic material and different colors may be utilized to indicate the function of the switch unit.

The contact unit 4 comprises a base 40 and a cover 42 which are preferably composed of insulating material suitable for molding. The cover may be attached to the base by means of bolts 43 which are disposed in openings 44 in laterally extending projections 46 and 48 on the base 40 and cover 42, respectively (see FIGS. 11 and 12). The contact unit 4 may be attached to the operating unit 2 by means of screws 49 which are disposed in openings 50 provided in the projections 48 on the cover 42. The screws 49 are threaded into tapped openings 53 in the bottom surface of the flange 8 of the sleeve 6. The screws 49 have cylindrical heads 51 which are internally threaded with threads corresponding to the threads on the other end of each screw. Thus, when the contact units are mounted in tandem relation, as will be described more fully hereinafter, the threaded end of one screw 49 may be threaded into the cylindrical head 51 of another screw 49 to mount one contact unit upon another.

As shown more clearly in FIGS. 10 to 13 inclusive the base 40 has a centrally disposed opening 52 therethrough. The cover 42 has an opening 54 therethrough which is in alignment with the opening 52 when the cover is attached to the base.

Figure 11:
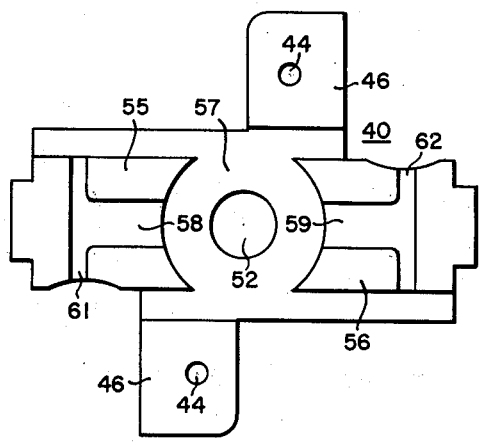
FIG. 11 is a view in plan, of the base shown in FIG. 10.

As shown more clearly in FIG. 11, the base 40 has two oppositely disposed projections 55 and 56 thereon. The ends of the projections are arcuately shaped thereby providing a central recess 57 in which the opening 52 is located. Longitudinally extending recesses 58 and 59 are provided in the projections 55 and 56, respectively. A transverse groove 61 is provided in the projection 55 and a similar groove 62 is provided in the projection 56.

Figure 12:
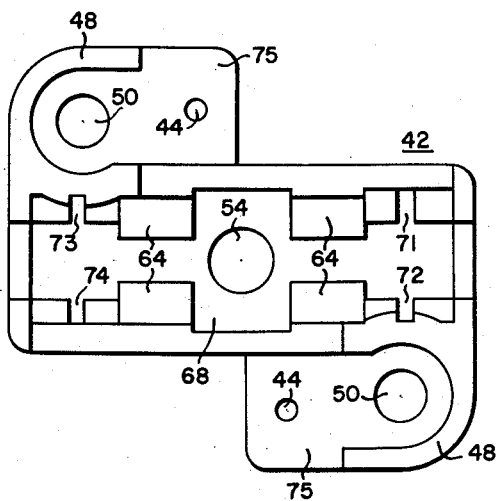
FIG. 12 is a view, in plan, of the cover of the enclosure for a contact unit.

As shown in FIG. 12 four spaced internal projections 64 are provided in a generally rectangular recess 67 in the cover 42. The four projections are disposed adjacent the central opening 54, thereby providing a rectangular recess 68 in which the opening 54 is located. Grooves 71 and 72 are provided in the sides of the cover in alignment with the groove 62 in the base 40, and grooves 73 and 74 are provided in the sides of the cover in alignment with the groove 61 in the base 40.

Figure 13:
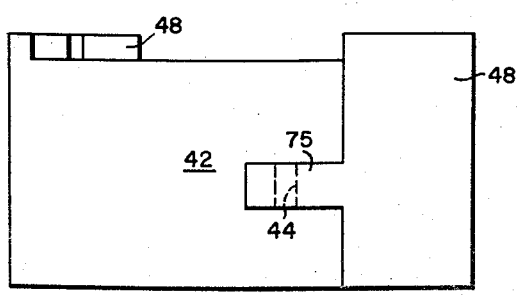
FIG. 13 is a view, in elevation, of the cover shown in FIG. 12.

As shown in FIG. 13 an external projection 75 extends horizontally from the projection 48 on the cover 42. A similar projection is provided on the other side of the cover. The openings 44 extend through the projections 75.

As shown in FIG. 1, a contact strip 76 is disposed at one end of the contact unit 4 and extends through an opening provided between the base 40 and the cover 42 of the enclosure for the contact unit. The inner end of the strip 76 rests upon the projection 56 on the base. A similar contact strip is provided at the other end of the contact unit. The inner end of the other contact strip rests on the projection 55 on the base. A contact member 77 is secured at the inner end of each contact strip. A terminal clip 78 and a terminal screw 79 are provided at the outer end of each strip for connecting an electrical conductor to the contact strip. A bridging contact member 81 is supported by a contact carrier 82. The bridging contact 81 is disposed to engage the spaced contact members 77, thereby completing an electrical circuit through the contact members.

Figure 8:
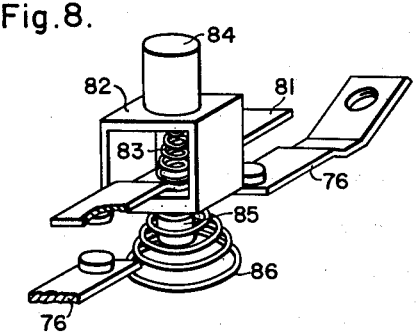
FIG. 8 is an isometric view of a normally open contact assembly for a contact unit.

As shown more clearly in FIG. 8 the contact carrier 82 is of a hollow cubical or a box-like structure. The bridging contact member 81 extends through the hollow carrier 82. A compression spring 83 is disposed between one side of the bridging contact member 81 and the upper wall of the carrier 82. The carrier 82 is provided with an upwardly extending projection 84 and a downwardly extending projection 85. The carrier 82 is preferably formed of an insulating material. A generally conically-shaped spring 86 surrounds the projection 85 on the carrier 82.

As shown in FIG. 1, the projection 84 extends through the opening 54 in the cover 42 and also through an opening 87 in an insulating spacer 88 provided between the operating unit 2 and the contact unit 4. The upper end of the projection 84 is engaged by the actuating disc 26 when the operating head 22 is depressed. In this manner the carrier 82 is moved downwardly against the force of the spring 86 which is disposed in the recess 57 in the base 40 and rests upon the wall of the base. As the carrier 82 is moved downwardly the bridging contact 81 engages the fixed contact members 77. Contact pressure between the member 81 and the members 77 is maintained by the compression spring 83. When the operating head 22 is released the spring 86 raises the contact carrier 82 to disengage the bridging contact member 81 from the fixed contact members 77.

As previously explained, the contact unit 4 shown in FIG. 2 is similar to the one in FIG. 1 except that the contact members within the unit are normally closed instead of normally opened. Fixed contact strips 90 which are generally of a Z shape, are mounted in the enclosure for the contact unit. Each contact strip 90 has a contact member 89 at its inner end and a terminal clip 78 and a terminal screw 79 at its outer end. An insulating spacer member 91 is disposed in the groove 62 in the base 40 and the grooves 71 and 72 in the cover 42. A similar spacer member is provided in the groove 61 in the base 40 and the grooves 73 and 74 in the cover 42. The spacing members 91 aid in supporting the contact strips 90 and also insulate the strip 90 from a bridging contact member 92 when the bridging member is disengaged from the fixed contact members 89. It will be noted, that the spacing member 91 is disposed in a different position in FIG. 2 from its position in FIG. 1 in which it is above the contact strip 76.

Figure 9:
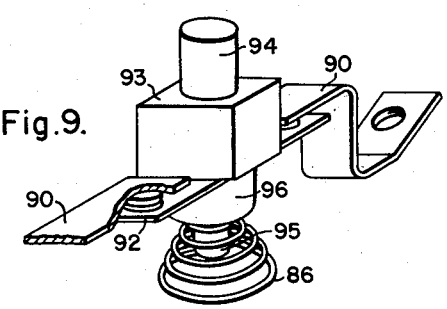
FIG. 9 is an isometric view of a normally closed contact assembly for a switch unit.
Figure 10:
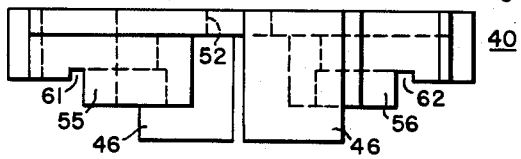
FIG. 10 is a view, in elevation, of the base of the enclosure for a contact unit.

As shown in FIG. 9 the contact carrier 93 which supports the bridging contact member 92 is of a solid cubical construction having outside dimensions similar to the outside dimensions of the hollow cubical carrier 82. The carrier 93 has an upwardly extending projection 94 and a downwardly extending projection 95. A spring 86 surrounds the projection 95 and a washer 96 is disposed between the upper end of the conical spring 86 and the bridging contact member 92. The contact carrier 93 is disposed in the recess 68 provided in the cover 42 between the projections 64 previously described. Likewise, the carrier 82, shown in FIG. 1, is disposed in the recess 68.

When the operating head 22 is depressed the actuating disc 26 engages the projection 94 on the carrier 93, thereby moving the carrier downwardly to disengage the bridging contact member 92 from the spaced fixed contact members 89. When the operating head 22 is released the spring 86 raises the carrier 93 to engage the bridging contact 92 with the fixed contact members 89. Contact pressure between the bridging contact member and the fixed contact members is maintained by the spring 86.

Figure 3:
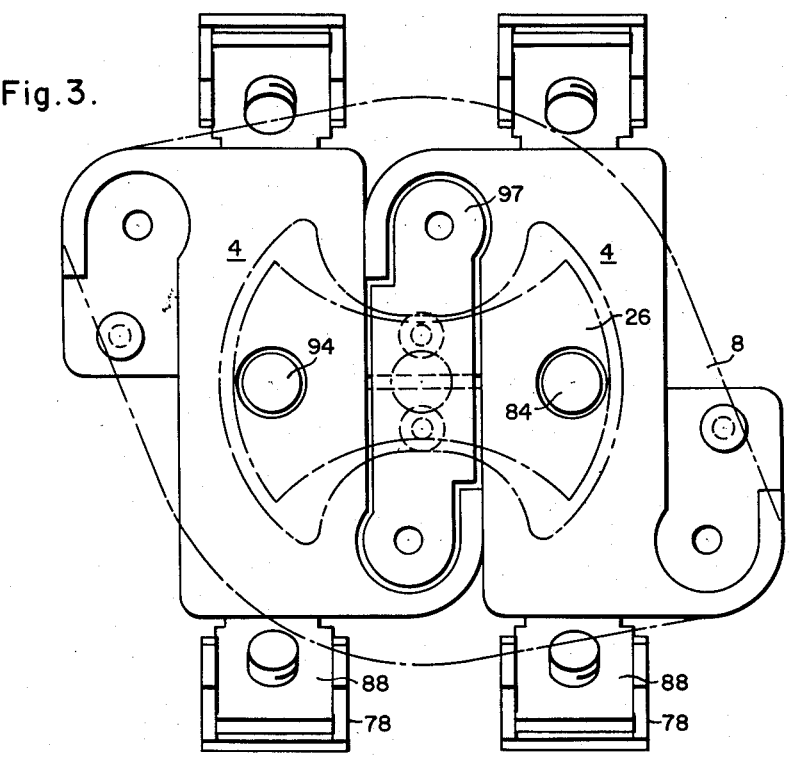
FIG. 3 is a view, in plan, of a switch assembly having two contact units mounted on an operating unit in side-by-side relation, the outline of the operating unit being shown in broken lines.
Figure 4:
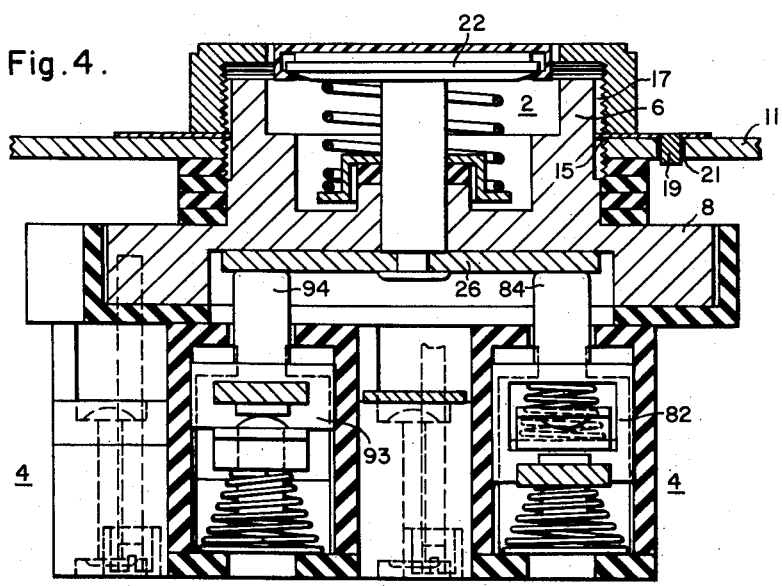
FIG. 4 is a view, in section, of the switch assembly shown in FIG. 3.

As shown in FIGS. 3 and 4, two contact units 4 may be mounted on a single operating unit 2 in side-by-side relation. The contact units are so constructed that the laterally extending projections on the units can overlap each other. The two units may be tied together by a connecting link 97 as shown in FIG. 3. The contact units may be attached to the operating unit by the screws 49 which, as previously explained, are threaded into tapped openings 53 in the flange 8 of the supporting member 6 of the operating unit.

As shown in FIG. 4, one of the operating units may contain normally closed contact members and the other unit may contain normally open contact members. If desired, both units may be of the normally closed type or both units may be of the normally opened type. As shown in FIG. 4, the upwardly extending projection 94 of the carrier 93 is engaged by one end of the actuating disc 26. Likewise, the upwardly extending projection 84 of the carrier 82 is engaged by the other end of the actuating disc 26. Thus, both contact carriers are moved downwardly simultaneously when the operating head 22 is depressed. In this manner the normally closed contact members in the left hand unit 4 are opened and the normally opened contact members in the right hand unit 4 are closed by depressing the operating head 22.

Figure 5:
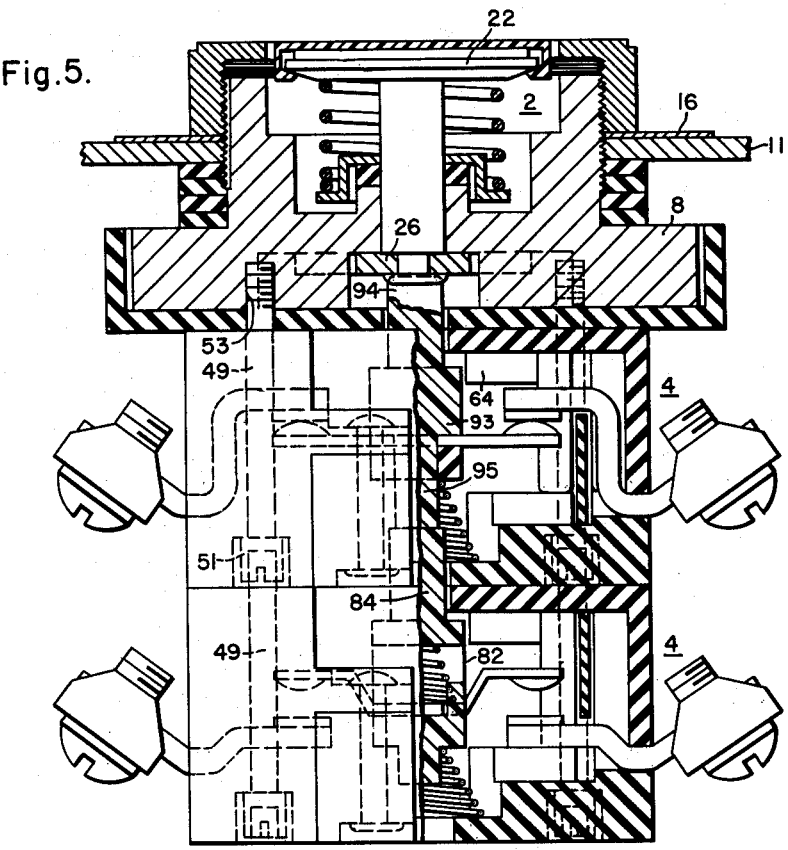
FIG. 5 is a view, partly in section and partly in elevation, of a switch assembly having two contact units mounted on an operating unit in tandem relation.
Figure 6:
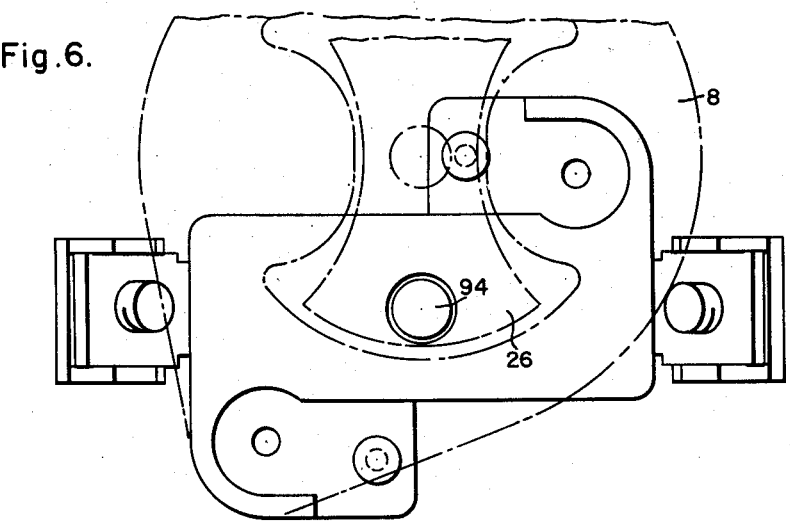
FIG. 6 is a view, in plan, of the switch assembly shown in FIG. 5, the outline of the operating unit being shown in broken lines.

As shown in FIGS. 5 and 6, two contact units 4 may be mounted on a single operating unit in tandem relation. The one contact unit may contain normally closed contact members and the other may contain normally opened contact members or both units may contain contact members of the same type. As previously explained, the upper contact unit 4 is connected directly to the flange 8 of the operating unit by screws 49. The lower contact unit 4 is attached to the upper unit 4 by similar screws 49 which are threaded into the cylindrical heads of the screws 49 in the upper unit.

As shown in FIG. 5, the projection 94 on the carrier 93 in the upper unit is engaged by the actuating disc 26. The projection 84 of the carrier 82 in the lower unit is engaged by the projection 95 on the carrier 93 in the upper unit. Thus, when the operating head 22 is depressed the contact carriers in both units are moved downwardly simultaneously, thereby opening the contact members in the upper unit and closing the contact members in the lower unit.

If desired, two contact units 4 may be attached to the operating unit 2 in side-by-side relation, as shown in FIGS. 3 and 4, and two contact units 4 may then be attached to the first two contact units in tandem relation, thereby providing a switch assembly having four contact units actuated by a single operating unit. It is also possible to continue the attaching of additional contact units in tandem relation, thereby increasing the number of contact units which can be operated from a single operating unit. Therefore, it is apparent that the present structure provides flexibility in the choice of type and number of contact units which can be operated from a single operating unit. Thus, the contact units may be chosen in accordance with the requirements of the electrical circuits to be controlled by the units.

From the foregoing description it is apparent that the invention provides a switch assembly which is relatively simple in construction and which may be economically manufactured and installed. One or a plurality of contact units may be mounted on and operated by a single operating unit. The contact arrangement in the contact units may be selected as desired. Therefore, a switch assembly having a desired number of contact units of either the same or a different type may be built up from a single operating unit and the desired number of contact units. It is necessary to manufacture only the two types of contact units, namely normally open and normally closed contact units. Since the housing for both units is the same in structure, the number of parts required is relatively small.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a control switch, in combination, an operating unit having a manually operable operating member therein, a plurality of separately enclosed contact units attachable to the operating unit in either side-by-side relation or in tandem relation, each contact unit comprising an enclosure having a laterally extending mounting projection thereon, said projections overlapping when the contact units are in side-by-side relation, a pair of spaced contact members disposed inside the enclosure, a bridging contact member for engaging said spaced contact members, a contact carrier for movably supporting the bridging contact member, said carrier having a portion projecting from said enclosure for actuation by said operating member, and the dividing line between said overlapping projections being substantially on a centerline through said operating member and said carriers when the contact units are in side-by-side relation.

2. In a control switch, in combination, an operating unit having a manually operable operating member therein, a plurality of separately enclosed contact units attachable to the operating unit in either side-by-side relation or in tandem relation, each contact unit comprising an enclosure having a laterally extending mounting projection thereon, said projections overlapping when the contact units are in side-by-side relation, a pair of spaced contact members disposed inside the enclosure, a bridging contact member for engaging said spaced contact members, a contact carrier for movably supporting the bridging contact member, said carrier having one portion projecting from said enclosure for actuation by said operating member, another portion on said carrier for actuating the carrier of another contact unit when said units are attached to the operating unit in tandem relation, and the dividing line between said overlapping projections being substantially on a centerline through said operating member and said carriers when the contact units are in side-by-side relation.

3. In a control switch, in combination, an operating unit having a manually operable operating member therein, a plurality of separately enclosed contact units attachable to the operating unit in either side-by-side relation or in tandem relation, each contact unit comprising an enclosure having a laterally extending mounting projection thereon, said projections overlapping when the contact units are in side-by-side relation, a pair of spaced contact members disposed inside the enclosure, a bridging contact member for engaging said spaced contact members, a contact carrier for movably supporting the bridging contact member, said carrier having a body portion and an upper projection and a lower projection on the body portion, said upper projection extending through said enclosure for actuation by said operating member, said lower projection being disposed to actuate the carrier of another contact unit when said units are attached to the operating unit in tandem relation, and the dividing line between said overlapping projections being substantially on a centerline through said operating member and said carriers when the contact units are in side-by-side relation.

4. In a control switch, in combination, an operating unit comprising a supporting member having a cylindrical portion with an outwardly extending flange at its inner end, an operating shaft slidably disposed in the supporting member, an actuating member at the inner end of said shaft, an operating head at the outer end of the shaft, a generally cup-shaped plastic cover on the operating head, a clamping ring threaded on the cylindrical portion of the supporting member, an inwardly extending flange on the clamping ring, and the inner edge of said cover being inside the flange on the clamping ring to prevent removal of the cover without removing the clamping ring.

5. In a control switch, in combination, an operating unit comprising a supporting member having a cylindrical portion with an outwardly extending flange at its inner end, an operating shaft slidably disposed in the supporting member, an actuating member at the inner end of said shaft, an operating head at the outer end of the shaft, a generally cup-shaped plastic cover on the operating head, a clamping ring threaded on the cylindrical portion of the supporting member, an inwardly extending flange on the clamping ring, the inner edge of said cover being inside the flange on the clamping ring to prevent removal of the cover without removing the clamping ring, a contact unit having an enclosure attached to said supporting member, a pair of spaced contact members inside the enclosure, a bridging contact member for engaging the spaced contact members, a carrier for movably supporting the bridging contact member, and a projection on the carrier actuated by the actuating member on the operating shaft.

6. In a control switch, in combination, an operating unit comprising a supporting member having a cylindrical portion with an outwardly extending flange at its inner end, an operating shaft slidably disposed in the supporting member, an actuating member at the inner end of said shaft, an operating head at the outer end of the shaft, a generally cup-shaped plastic cover on the operating head, an inturned portion on the inner edge of the cover engaging the underside of the operating head, a clamping ring threaded on the cylindrical portion of the supporting member, an inwardly extending flange on the clamping ring, and said inturned portion on the cover being inside the flange on the clamping ring to prevent removal of the cover without first removing the clamping ring.

7. In a control switch, in combination, an operating unit comprising a supporting member having a cylindrical portion with an outwardly extending flange at its inner end, an operating shaft slidably disposed in the supporting member, an actuating member at the inner end of said shaft, an operating head at the outer end of the shaft, a generally cup-shaped plastic cover on the operating head, an inturned portion on the inner edge of the cover engaging the underside of the operating head, a clamping ring threaded on the cylindrical portion of the supporting member, an inwardly extending flange on the clamping ring, and said inturned portion on the cover being inside the flange on the clamping ring to prevent removal of the cover without first removing the clamping ring, a plurality of separately enclosed contact units attachable to the supporting member in either side-by-side relation or in tandem relation, each contact unit comprising an enclosure, a pair of spaced contact members disposed inside the enclosure, a bridging contact member for engaging said spaced contact members, a carrier for movably supporting the bridging contact members, a projection on the carrier for actuation by the actuating member on the operating shaft, and another projection on the carrier for actuating the carrier of another contact unit when said units are attached to the supporting member in tandem relation.

8. In a control switch, in combination, an operating unit comprising a flanged supporting sleeve for mounting in a panel having an opening therein for the sleeve, a manually operable operating member slidably mounted in the sleeve, a slot on the outside of the sleeve, an adapter for fitting over the sleeve, a projection on the adapter disposed in the slot to prevent the adapter from turning on the sleeve, another projection on the adapter for fitting into a hole in the panel to prevent the adapter and the sleeve from turning in the panel, an enclosed contact unit attached to the flange on the sleeve, a pair of spaced contact members disposed in the contact unit, a bridging contact member for engaging the spaced contact members, a contact carrier for movably supporting the bridging contact member, and said carrier having a portion projecting from the contact unit for actuation by said operating member.

References Cited in the file of this patent

UNITED STATES PATENTS

| | | |
|---|---|---|
| 2,460,034 | Robbins | Jan. 25, 1949 |
| 2,841,661 | Wintle | July 1, 1958 |
| 2,889,437 | Christensen | June 2, 1959 |